(No Model.)

C. E. PHILLIPS.
BLADE FOR ROTARY CUTTERS.

No. 341,940. Patented May 18, 1886.

Witnesses.
Lauritz W. Möller.
John R. Snow.

Inventor.
Charles E. Phillips,
by J. E. Maynadier
Atty

United States Patent Office.

CHARLES E. PHILLIPS, OF ROCHESTER, NEW YORK, ASSIGNOR TO HOMER ROGERS, TRUSTEE, OF BOSTON, MASSACHUSETTS.

BLADE FOR ROTARY CUTTERS.

SPECIFICATION forming part of Letters Patent No. 341,940, dated May 18, 1886.

Application filed August 29, 1885. Serial No. 175,615. (No model.)

*To all whom it may concern:*

Be it known that I, CHARLES E. PHILLIPS, of Rochester, in the county of Monroe and State of New York, have invented a new and useful Blade for Rotary Cutters, of which the following is a specification, reference being had to the accompanying drawings, making a part hereof, in which—

Figure 1:
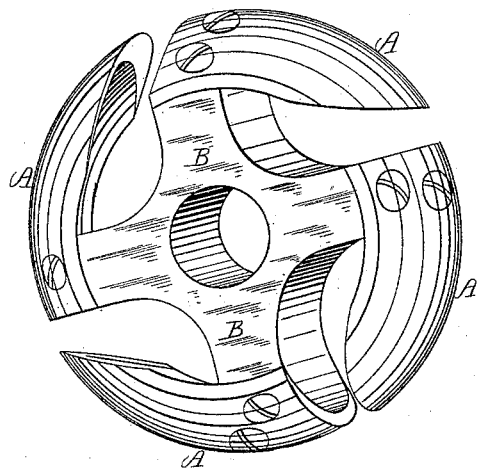
Figure 2:
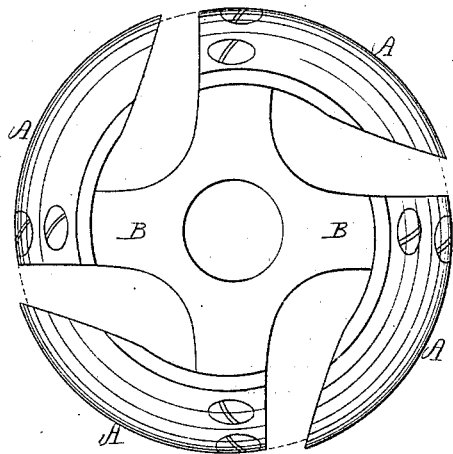
Figure 3:
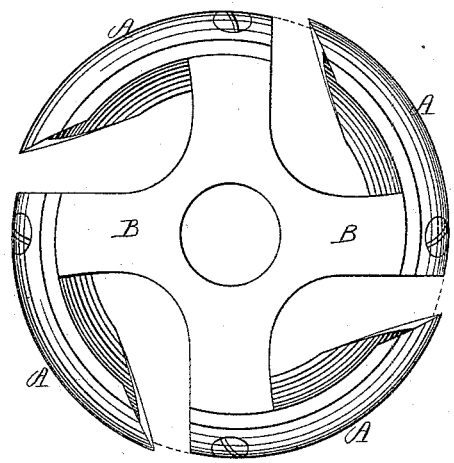
Figure 4:
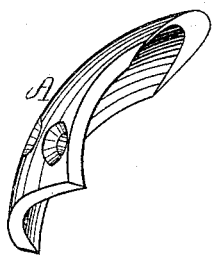

Figure 1 is a perspective view of a cutter with four of my new blades. Figs. 2 and 3 are side elevations, and Fig. 4 is a perspective, of one of the blades detached.

The rotary cutter shown in the drawings is especially adapted for trimming the heels of boots and shoes; but my invention is applicable, generally, to the blades not in one piece with a hub, for my invention consists in a blade made of sheet metal and molded into the desired shape, so that when its end is ground off by a flat grinding-surface an edge will be formed of the desired contour. This edge may be made more or less keen by varying the angle formed by the flat front face and the periphery of the blade, and as the blade is of sheet metal the grinding is less laborious than in any other blade of this class.

The blade A is best made of sheet metal and brought to the desired shape by pressure between suitable molds, then fastened in its place on the hub after being properly tempered, and its exterior surface finished to the exact shape desired by grinding. After sharpening it is ready for use. The thickness of the blades will of course vary according to the work for which the cutter is designed. The manner of securing the blades to the hub B or its equivalent will also vary, various means being known.

The chief advantages of my new blade are cheapness of construction, readiness of grinding, and, as they do not readily heat, the edge is better preserved, so that they do not require to be ground so frequently as the cutters now generally used in leather work. The dotted lines show the clearance.

Heretofore all cutter-blades with a molded curved exterior have been made with the inner side plane, some portions of the blade being consequently very thick in comparison with other portions, while in my blade the exterior and interior surfaces are substantially parallel, and both these surfaces are molded or curved, and this is the distinguishing characteristic of my invention.

What I claim as my invention is—

The cutter-blade above described, made of sheet metal, shaped as shown, with its exterior surface the converse of the form to be cut, and its inner surface substantially parallel with its exterior surface, sharpened by grinding at one end, and adapted to be secured to a rotating head, all substantially as and for the purpose set forth.

C. E. PHILLIPS.

Witnesses:
   F. B. HUTCHINSON,
   GEO. W. TUTTLE.